Jan. 13, 1942.  F. H. SHEPARD, JR  2,270,012
DISTORTION REDUCING CIRCUITS
Original Filed March 31, 1936  2 Sheets-Sheet 1

INVENTOR
F. H. SHEPARD, JR.
BY
ATTORNEY

Jan. 13, 1942.  F. H. SHEPARD, JR  2,270,012
DISTORTION REDUCING CIRCUITS
Original Filed March 31, 1936    2 Sheets-Sheet 2

INVENTOR
F. H. SHEPARD, JR.
BY H. S. Grover
ATTORNEY

Patented Jan. 13, 1942

2,270,012

UNITED STATES PATENT OFFICE 2,270,012

DISTORTION REDUCING CIRCUITS

Francis H. Shepard, Jr., Merchantville, N. J., assignor to Radio Corporation of America, a corporation of Delaware Original application March 31, 1936, Serial No. 71,941. Divided and this application March 27, 1940, Serial No. 326,180

11 Claims. (Cl. 179—171)

This application is a division of application Serial No. 71,941 filed March 31, 1936, now issued as Patent No. 2,198,464 on April 23, 1940.

The present invention relates broadly to relay circuits employing thermionic tubes and to such circuits as are incorporated in radio signalling apparatus and the like.

In the usual radio receiver, the detector output is fed to an amplifier and/or a power output circuit from which it is fed into a reproducer which may be a loudspeaker. Certain distortions are introduced due to the characteristics of the amplifying and/or power output tubes of these circuits as well as due to irregularities in the output loading device such as electrical and mechanical resonances of the output devices for instance the loudspeaker.

The resonances mentioned above appear to be accentuated in practice when the output load is fed by a tube having normally high internal impedance. The present invention contemplates reducing the apparent internal impedance of the tube by feeding back to the tube input either all or a part of the A. C. output voltage in proper phase relationship. In this way the internal resistance of the tube becomes more effective to damp out the resonant peaks of the load, that is to say, the resonant peaks of the load impedance are damped out by feeding back to the relay input a predetermined percentage of the A. C. output voltage.

It is an object of the present invention to devise various circuit arrangements for overcoming the above mentioned distortions either in whole or in part.

Broadly speaking, the invention contemplates methods of comparing a part or the whole of the amplifier output voltage with the input voltage and applying any departure from a definite relationship between these, as signal, preferably to an intermediate amplifier in such a manner that the discrepancy will tend to be corrected.

The invention is particularly useful in connection with circuits employing a tube or tubes having a non-linear relationship between grid potential and plate current or in circuits in which the tube output load impedance is not linear and/or not uniform at all frequencies. Therefore instead of attempting to correct the load or tube characteristic it is contemplated in accordance with the invention to feed back voltage into the grid circuit of the tube or tubes in such a manner that discrepancies between the input and output voltages create a signal which is applied to the amplifier in a sense to correct the discrepancy.

According to the invention, the amplifier acts as a governor or regulator to control or keep the output voltage equal to a definite function of the input voltage. Any departure from this definite ratio creates a signal which when fed into the amplifier creates currents in the output of the amplifier which are of such magnitude and direction as to tend to correct the discrepancy.

The invention will be more readily understood by reference to the following detailed specification when read in conjunction with the drawings, the various figures of which illustrate various modifications of the invention.

In the drawings:

Fig. 1 is a circuit representation of an arrangement which combines the advantages of the circuit arrangements shown in Figs. 3 and 7 of the parent patent above referred to;

Figure 1:
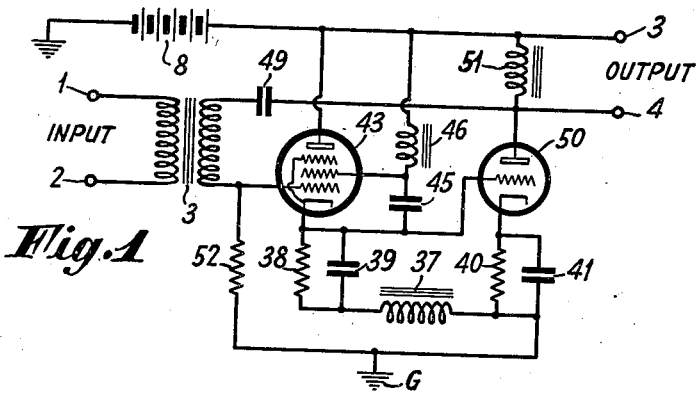

Referring to Fig. 1, tube 50 is an output tube having a self-bias resistor 40 by-passed for audio frequencies by the condenser 41. The A. C. output voltage of this tube is fed to the A. C. load through terminals 3 and 4. The choke 51 has a high A. C. impedance and is used to supply D. C. plate current to the tube 50. The grid of tube 50 is connected to the cathode of the tube 43. The plate of tube 43 is supplied with a positive B voltage as shown and is effectively grounded for A. C. The cathode of this tube which is connected to the grid of tube 50 is returned to ground through the high impedance inductance 37 and the self-bias resistor 38 which is by-passed by condenser 39. The screen of tube 43 is returned for D. C. to the positive B voltage through inductance or impedance 46, and it is grounded for A. C. to the cathode of tube 43 by means of condenser 45. The control grid of this tube is returned to ground for D. C. through grid leak resistor 52. A. C. signal input is applied between the plate of the output tube 50 and the grid of the tube 43 by means of the input transformer 3. Condenser 49 serves as a means of isolating the D. C. on the plate of tube 50 from the grid of tube 43. The input signal voltage is applied to the primary of transformer 3 through the input terminals 1 and 2.

It will be seen on examining Figure 1 that the input voltage applied between the plate of tube 50 and the grid of tube 43 must be of sufficient value to overcome the A. C. signal on the plate of tube 50 before any actual A. C. signal is applied between the grid and cathode of tube 43. It can be seen that any discrepancy between the input voltage and output voltage results in a signal between the grid and cathode of tube 43. This grid to cathode signal tends to correct the difference between input and output voltage. The arrangement shown in Fig. 1 tends to maintain an output voltage across a load substantially equal to the input voltage. If the output voltage is across a low impedance load, however, it represents large power output compared to the power input produced by the same voltage across the high impedance input circuit. Hence, although there may not be any amplification of voltage in the system there is a large and distortionless power amplification.

Figure 2:
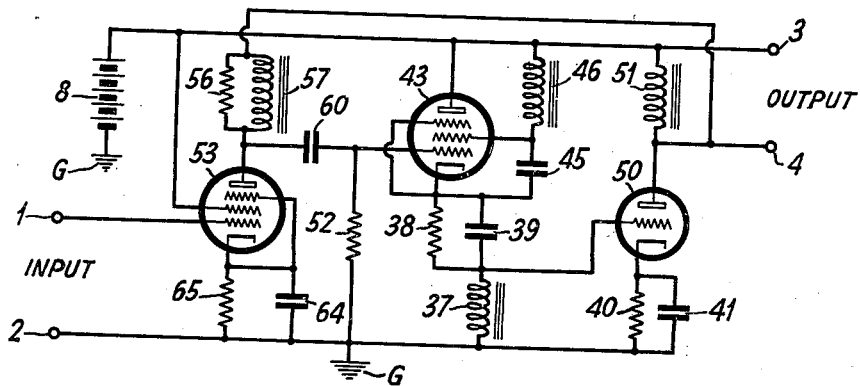
Fig. 2 is a diagrammatic illustration of an arrangement which combines the advantages of the arrangements shown in Figs. 5 and 7 of said parent patent.

Referring to Fig. 2, tube 50 is an output tube and tube 43 is a driver tube both of which operate in exactly the same manner as tubes 43 and 50 described in Fig. 1. The difference of this circuit being that the signal fed between the plate of tube 50 and the grid of tube 43 is generated in the plate circuit or across the plate circuit load 56 and 57 of tube 53. Tube 53 is a high impedance pentode type of tube in which the plate current is only slightly affected by the plate voltage. The cathode of tube 53 is returned to ground through self-bias resistor 65 which is by-passed by the condenser 64. The screen of this tube 53 is returned directly to the positive B voltage which is at an A. C. ground potential. Signal input to this tube 53 is applied between the control grid and ground through terminals 1 and 2. This A. C. signal results in a variation of plate current which creates a varying voltage across the plate resistor or plate load 56 and 57. This voltage corresponds to the voltage across the transformer 3 as described in Fig. 1.

It will be noted that the arrangement shown in Fig. 2 replaces the input transformer 3 of Fig. 1 by an auto-transformer 57 (see Fig. 2) connected in the plate circuit of a preceding voltage amplifier tube. Insofar as the feedback features of the invention are concerned, the arrangements shown in Figs. 1 and 2 are substantially the same.

Figure 3:
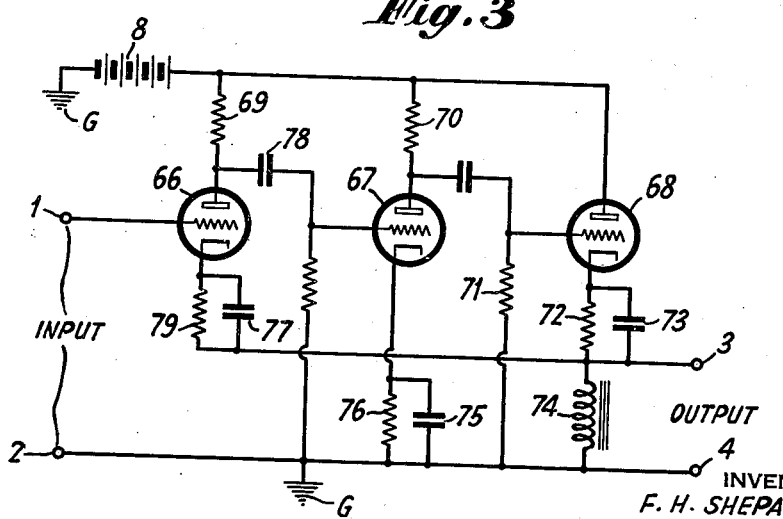
Fig. 3 is a diagrammatic illustration of a modification of the arrangement shown in Fig. 1 of said parent patent wherein the difference between the input and output voltages is amplified before being applied to the grid of the output tube.

Fig. 3 is a multi-tube arrangement in which the A. C. input voltage across terminals 1 and 2 is compared to the A. C. output voltage across terminals 3 and 4. The difference between the instantaneous values of the A. C. voltages results in a signal being applied between the grid and cathode of tube 66. The voltage output of tube 66 is amplified in a conventional manner by tube 67 and is applied to the grid of tube 68 in such a manner that the output current of tube 68 is varied to buck out the difference between the input voltage across terminals 1 and 2 and the output voltage across terminals 3 and 4. By introducing a high degree of amplification the discrepancy between input and output voltages can be greatly minimized.

Figure 4:
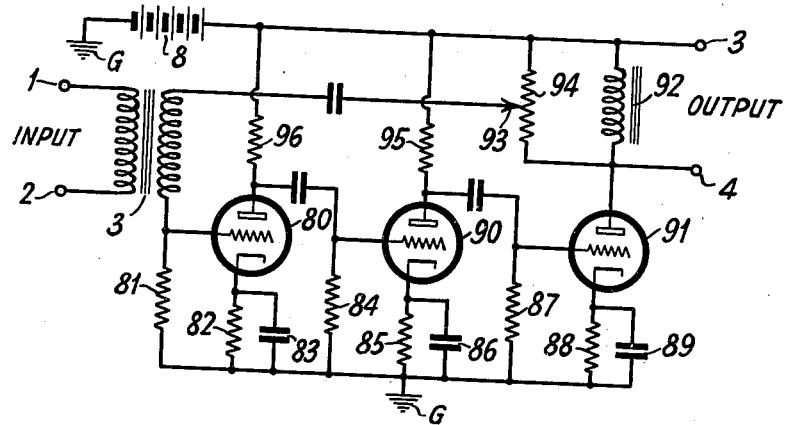
Fig. 4 illustrates in diagrammatic form a variation of the arrangement shown in Fig. 3 in which the load can be placed in the plate circuit of the output tube; and, Fig. 5 illustrates in diagrammatic form a phase inverter stage driving a push-pull output stage consisting of a pair of output pentodes.

In Fig. 4 tube 91 is an output tube the A. C. plate load of which may be connected across terminals 3 and 4. The D. C. plate voltage may be supplied to the plate of the tube through the inductance 92. The bias to the cathode of tube 91 is obtained by means of the self-bias resistor 88 which is by-passed by the condenser 89. Tubes 80 and 90 act as amplifiers to amplify the voltage applied between the grid and cathode of tube 80. This amplified voltage is applied to the grid of tube 91. Potentiometer 94 is a high impedance voltage divider device placed across the output load. The signal input voltage is applied to the primary of transformer 3. The output of the secondary of transformer 3 applies signal between the slider 93 of potentiometer 94 and the grid of tube 80. It can be seen that the difference between the voltage across the secondary of transformer 3 and the voltage across the upper part of potentiometer 94 is applied as signal between the grid and cathode of tube 80 (the cathode of tube 80 is held at A. C. ground potential by means of by-pass condenser 83). It can be seen that it is not necessary to compare the total output voltage with the input voltage but a part of the output voltage obtained by means of an inductance capacitance or resistance divider across the load can be compared to the signal input as described above.

Figure 5:
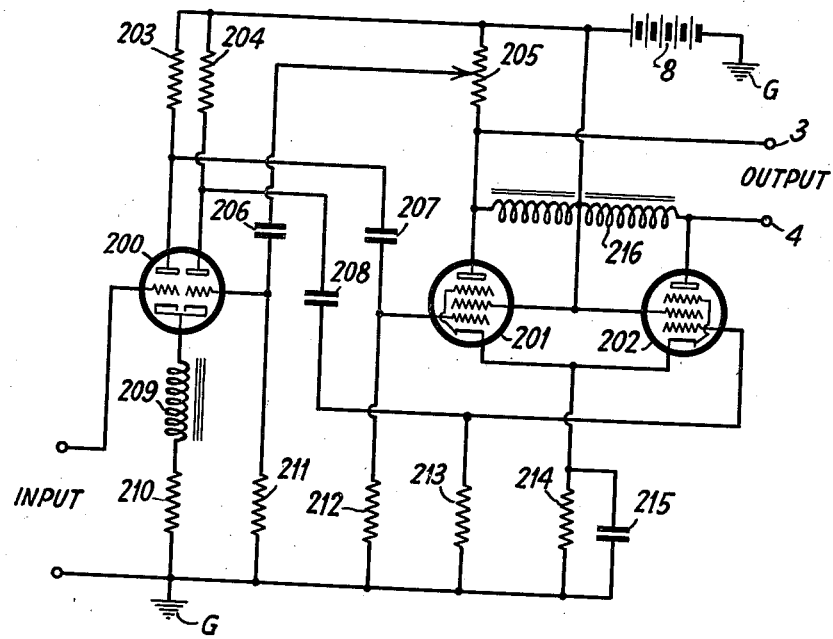

In Fig. 5 tubes 201 and 202 are connected in a conventional push-pull output stage. The grids of this push-pull output stage are driven respectively through condensers 207 and 208 by the plates of the double tube 200. Input voltage fed to the grid of one triode section of tube 200 results in an increased plate current in that particular section. This increased current through the inductor 209 causes the potential of the cathodes of tube 200 to change in such a manner that signal is created between the grid and cathode of the other triode unit of tube 200 in such a manner that the current change through that triode section is almost equal and opposite to the plate current change of the first section. This effect results practically in equal and opposite voltages being applied to the grids of the tubes 201 and 202. Part of the output voltage is obtained by the slider on potentiometer 205. This voltage is applied through condenser 206 to the grid of the second section of the triode section of the duo tube 200. This signal is of such direction and magnitude that it opposes the change created by the input signal to the grid of the other triode section. In conclusion it can be seen that signal to the grids of the push-pull output stage is created only by a difference in potential between the two grids of the input of the duo purpose input tube. In this circuit the input voltage on the grid of the first triode unit of tube 200 is compared with a whole or part of the output voltage obtained from the potentiometer 205 and applied to the grid of the second triode unit of tube 200. This difference between the two grids of tube 200 results in a signal being applied to the grids of the output tube in such a manner as to correct for the difference in potential between the two grids of tube 200. In other words, the second grid of tube 200 should have potentials equal to but opposite those on the first grid of the tube.

I claim:
1. In an amplifier circuit a driven tube provided with an anode, a cathode and a signal grid, connections external to said tube forming an input circuit and an output circuit for said tube, a driver circuit for said tube including an electronic tube having an anode, a cathode and a signal grid, connections external to said second named tube forming an input circuit and an output circuit therefor, means for coupling the output circuit of the driver tube to the input circuit of the driven tube, a source of signal energy to be amplified, means for impressing the energy to be amplified between the anode of the driven tube and the signal grid of the driver tube and also between the anode and cathode of the driven tube, whereby the output voltage of the driven tube is compared with the input signal energy voltage, a source of space current and means including an output impedance device for connecting the anode of the driven tube to the source of space current.

2. In amplifying apparatus, a driver tube having an anode, a cathode, and a signal grid electrode, a driven tube provided with an anode, a cathode and a signal grid electrode, an input circuit for said first tube including an input impedance, a condenser, a first output impedance, a source of space current and a second output impedance connected in series between the grid electrode of the first tube and the cathode thereof, an output circuit for said first tube comprising a connection including the source of space current and said second output impedance in series between the anode and the cathode of the first tube, an input circuit for said driven tube comprising a connection including the said second output impedance between the grid electrode and the cathode of the driven tube and an output circuit for said driven tube including said first output impedance and the source of space current in series connected between the anode of the driven tube and the cathode thereof.

3. In amplifying apparatus, a first electronic tube having at least cathode, control grid and anode electrodes, an input circuit and an output circuit associated with said electrodes, an input impedance included in said input circuit across which the energy to be amplified is impressed, an output impedance included in said output circuit, a second electronic tube having at least cathode, control grid and anode electrodes, an input circuit and an output circuit associated with said electrodes, said latter input circuit including at least a portion of said output impedance of the first tube whereby energy developed across the output impedance is impressed upon the input circuit of said second tube, an output impedance device included in the output circuit of the second tube across which the output energy of said tube is impressed, and means for including at least a portion of said last named output impedance in said first named input circuit in series with said first named input impedance whereby at least a part of the output energy of said second tube is impressed upon said first named input circuit.

4. The arrangement described in claim 3 wherein at least a portion of the first named output impedance is included in the first named input circuit in series with the first named input impedance and the portion of the second named output impedance which is included in said first named input circuit, whereby at least a part of the output energy developed across the first named output impedance is impressed upon the first named input circuit.

5. In the arrangement described in claim 2, a screen grid electrode for said driver tube, means for applying a potential on said screen grid electrode which is positive relative to the cathode, and means including a condenser shunted between the screen grid electrode and the cathode for maintaining a substantially constant difference of potential between the screen grid and the cathode.

6. In amplifying apparatus, a first electronic tube having a cathode, a control grid and an anode, an input circuit connected to the control grid including an input impedance, a condenser and at least a portion of a first output impedance, and an output circuit connected to the anode including a load resistor and a source of space current in series, a second electronic tube having a cathode, a control grid and an anode, an input circuit connected to the grid of the second tube coupled to said output circuit of the first tube and an output circuit connected to the anode of the second tube including a load resistor and said source of space current in series, a third electronic tube having a cathode, a control grid and an anode, an input circuit connected to the grid of the third tube coupled to the last named output circuit and an output circuit connected to the anode of the third tube including said first named output impedance and said source of space current in series, the cathodes of the several tubes being connected to ground, and means for impressing energy to be amplified across said input impedance included in the input circuit of the first tube.

7. In an amplifier circuit, an electronic tube having an anode, a cathode and a grid electrode, a circuit including a plurality of impedances in series connected between said anode and cathode, an auxiliary circuit including a source of space current for said tube and a plurality of impedances in series, connected between said anode and cathode, one of said latter impedances constituting the output impedance of the amplifier, a second electronic tube having an anode, a cathode and a grid electrode, a circuit including said source of space current and an impedance device in series, connected between the anode and cathode of said second tube, means for connecting the grid electrode of said second tube to a point of said first named circuit, means for connecting the grid electrode of said first named tube to the cathode of said second tube, a source of signal voltage, and means for injecting said signal voltage in said first named circuit between the grid of said second tube and the anode of said first tube.

8. In signalling apparatus, a first electronic tube provided with an anode, a cathode, and a grid electrode, a connection between said anode and cathode including a source of direct current, a high impedance inductance device and a bias resistor in series, a second electronic tube having an anode, a cathode, and a control grid, means including a high alternating current impedance device for connecting said last named anode to the anode of said first tube, said high impedance device serving as the output impedance of the apparatus, means including a bias resistor for connecting the cathode of said second tube to a point of said first named connection intermediate said source of current and said high impedance inductance device, a source of signal voltage, means for impressing said signal voltage between the grid electrode of said first tube and the anode of said second tube, means including an impedance device for connecting the grid electrode of said first tube to said intermediate point of said first named connection, and means for connecting the cathode of the first tube to the control grid of said second tube.

9. In signalling apparatus, an output tube provided with an anode, a cathode, and a control electrode, a driver tube provided with an anode, a cathode, and a control electrode, a source of signal voltage, an impedance across which said signal voltage is impressed, means including said impedance and at least an additional impedance in series for connecting the anode of said output tube to the cathode thereof, a connection including a high impedance inductance and said additional impedance in series between the control electrode and the cathode of said driver tube, means for connecting the cathode of the driver tube to the control grid of the output tube, an output impedance connected between the anode of the output tube and the anode of the driver tube and a connection including a source of direct current and said high impedance inductance in series between the anode and the cathode of said driver tube.

10. In signalling apparatus, a first electronic tube having an anode, a cathode, and a grid electrode, a circuit including a load impedance, a source of space current and a biasing impedance all connected in series between the anode and the cathode of said tube, a connection including a pair of impedances and said bias impedance in series between said anode and cathode, a second electronic tube having an anode, a cathode, and a grid electrode, means including at least one of said pair of impedances for connecting the grid electrode of said second electronic tube to the anode of said first electronic tube, a source of signal voltage, means for impressing the signal voltage across said last named impedance, means connecting the cathode of said second electronic tube to the control electrode of said first tube, means including the other of said pair of impedances and the bias impedance in series for connecting the control electrode of said second tube to the cathode of said first tube, a connection including the last named one of said pair of impedances and additional impedance in series for connecting the control electrode of said second tube to the cathode thereof, and means including said source of direct current for connecting a point of said last named connection intermediate said other impedance and the additional impedance to the anode of said second tube.

11. The arrangement described in the next preceding claim wherein said source of signal voltage comprises a space discharge device having an anode, a cathode, and a grid electrode, a pair of signal input terminals, means for connecting said grid electrode to one of said terminals, means including impedance for connecting the cathode of said space discharge device to the other of said input terminals and means including said impedance device which is connected between the grid electrode of the second tube and the anode of the first tube, said load impedance, said source of direct current for connecting the anode of said space discharge device to said other terminal.

FRANCIS H. SHEPARD, Jr.